(12) United States Patent
Gashi

(10) Patent No.: US 10,718,345 B2
(45) Date of Patent: Jul. 21, 2020

(54) AIR COMPRESSOR OR WATER PUMP

(71) Applicant: Belenos Clean Power Holding AG, Bienne (CH)

(72) Inventor: Rexhep Gashi, Givisiez (CH)

(73) Assignee: Belenos Clean Power Holding AG, Bienne (CH)

( * ) Notice: Subject to any disclaimer, the term of this patent is extended or adjusted under 35 U.S.C. 154(b) by 106 days.

(21) Appl. No.: 15/565,772

(22) PCT Filed: Mar. 17, 2016

(86) PCT No.: PCT/EP2016/055827
§ 371 (c)(1),
(2) Date: Oct. 11, 2017

(87) PCT Pub. No.: WO2016/165905
PCT Pub. Date: Oct. 20, 2016

(65) Prior Publication Data
US 2018/0119702 A1 May 3, 2018

(30) Foreign Application Priority Data
Apr. 13, 2015 (EP) ..................................... 15163420

(51) Int. Cl.
*F04D 29/046* (2006.01)
*F04D 1/00* (2006.01)
(Continued)

(52) U.S. Cl.
CPC ........... *F04D 29/0467* (2013.01); *F04D 1/00* (2013.01); *F04D 17/10* (2013.01); *F04D 29/046* (2013.01);
(Continued)

(58) Field of Classification Search
CPC .... F04D 17/10; F04D 29/0467; F04D 29/046; F04D 29/049; F04D 29/056; F04D 29/059
See application file for complete search history.

(56) References Cited

U.S. PATENT DOCUMENTS 1,454,041 A 5/1923 Cramer
3,748,000 A 7/1973 Laing
(Continued)

FOREIGN PATENT DOCUMENTS

EP 0 318 638 A2 6/1989
EP 0318638 A2 * 6/1989 ............. F04D 13/04

OTHER PUBLICATIONS

International Search Report dated Jun. 1, 2016 in PCT/EP2016/055827 filed Mar. 17, 2016.

*Primary Examiner* — Woody A Lee, Jr.
*Assistant Examiner* — Michael L Sehn
(74) *Attorney, Agent, or Firm* — Oblon, McClelland, Maier & Neustadt, L.L.P.

(57) ABSTRACT

An air compressor or water pump including a frame in which there are mounted a stator, a rotor interacting with the stator to form a synchronous motor, and including a shaft, at least one turbine carried by the shaft, a fluid-supply channel to the turbine, and an outlet channel for compressed fluid, the shaft of the rotor being mounted rotatably on the frame about an, axis by a first and a second bearing. The first, respectively the second, bearing includes a first, respectively a second, spherical element provided on a first, respectively a second, end of the shaft and disposed centered relative to the axis of the shaft, and a first, respectively a second, housing provided in the frame having a form of a cap disposed centered relative to the axis of the shaft and provided to support the first, respectively the second, spherical element.

12 Claims, 3 Drawing Sheets

(51) Int. Cl.
  *F04D 17/10* (2006.01)
  *F04D 29/049* (2006.01)
  *F04D 29/059* (2006.01)
  *F04D 29/056* (2006.01)
  *F16C 23/04* (2006.01)
  *F16C 17/08* (2006.01)
(52) U.S. Cl.
  CPC ......... *F04D 29/049* (2013.01); *F04D 29/056* (2013.01); *F04D 29/059* (2013.01); *F16C 17/08* (2013.01); *F16C 23/048* (2013.01); *F16C 2360/44* (2013.01)

(56) References Cited

U.S. PATENT DOCUMENTS

| | | | | |
|---|---|---|---|---|
| 5,746,575 A | * | 5/1998 | Westphal | F04D 29/0465 |
| | | | | 415/206 |
| 5,755,518 A | * | 5/1998 | Boutaghou | F16C 17/08 |
| | | | | 384/610 |
| 5,863,179 A | | 1/1999 | Westphal et al. | |
| 2005/0225186 A1 | | 10/2005 | Laing et al. | |

* cited by examiner

AIR COMPRESSOR OR WATER PUMP

CROSS-REFERENCE TO RELATED APPLICATIONS

This is a National phase Application in the United States of International Patent Application PCT/EP2016/055827 filed on Mar. 17, 2016 which claims priority on European patent application No. 15163420.1 filed on Apr. 13, 2015. The entire disclosure of the above patent applications are, hereby incorporated by reference.

FIELD OF THE INVENTION

The present invention relates to an air compressor or water pump and more particularly to a high-speed air compressor or water pump, comprising a frame in which there are mounted a stator, a rotor interacting with said stator to form a synchronous motor, and comprising a shaft, at least one turbine carried by said shaft, a fluid-supply channel to the turbine, and an outlet channel for compressed fluid, the shaft of the rotor being mounted rotatably on the frame about an axis by means of two bearings.

BACKGROUND OF THE INVENTION

Such fluid compressors are generally termed turbocompressors or centrifugal compressors. They are equipped, with a stator and a rotor forming a permanent-magnet synchronous motor (brushless motor). Compressors of this type can reach very high speeds, for example 100,000 to 500,000 rpm. The motor drives the high-speed turbine, the turbine compressing the fluid. The fluid can be air, water, a gas, a refrigerant or any other suitable fluid. These compressors are used in numerous industrial, medical, pharmaceutical, foodstuff, automobile applications, in particular for supplying compressed air, or in refrigeration, heating or air-conditioning applications, for supplying compressed fluid.

In these compressors, the motor shaft is mounted rotatably on a frame by means of two axial bearings. These bearings can comprise ball bearings. However, it is difficult to obtain speeds of rotation with such ball bearings because of the difference in speed between the balls and the ball races. Furthermore, although the balls used are made of ceramic, the life span of such bearings is limited to about one hundred hours because of the high speeds of rotation. Other types of bearing can be used, such as aerodynamic bearings. However, this type of bearings has the disadvantage of being displaced transversely at the moment of start-up or during a change in speed, which creates friction at the level of the bearing elements.

Furthermore, compressors are generally lubricated by means of a lubricant. The disadvantage is that the lubricant risks becoming mixed with the fluid such that the compressed fluid is polluted by the lubricant. This is particularly dangerous, for example in the case of medical applications, such as dental applications, for which the compressed air reaching the mouth must be safe.

Finally, the compressors are generally used in installations with very large dimensions, the compressor being at a remove from the equipment which requires compressed fluid. The compressed fluid is supplied by means of a supply circuit provided in the network. Generally, this supply circuit is long, which involves risks of leakages of fluid along the circuit. Leakages in a compressed air circuit involve losses of pressure, which generates very high financial losses. Furthermore, because of the distance separating the compressor from the equipment which requires the compressed fluid, the network is permanently maintained under pressure in order to be able to respond rapidly as needed to the equipment. The permanent functioning of the compressor represents a high consumption of electrical energy.

SUMMARY OF THE INVENTION

The object of the invention is in particular to remedy the various disadvantages of known high-speed compressors.

More particularly, an object of the invention is to provide a high-speed air compressor or water pump which does not require a lubricating agent and does not involve any pollution of the compressed fluid.

To this end, the present invention relates to an air compressor or water pump comprising a frame in which there are mounted a stator, a rotor interacting with said stator to form a synchronous motor, and comprising a shaft, at least one turbine carried by said shaft, a fluid-supply channel to the turbine, and an outlet channel for compressed fluid, the shaft of the rotor being mounted rotatably on the frame about an axis by means of a first and a second bearing.

According to the invention, said first, respectively said second, bearing comprises a first, respectively a second, spherical element provided on a first, respectively a second, end of the shaft and disposed centred relative to the axis of the shaft, and a first, respectively a second, housing provided in the frame and having the form of a cap disposed centred relative to the axis of the shaft and provided in order to support said first, respectively said second, spherical element.

Hence, the air compressor or water pump according, to the invention is able to turn at very high speed, without using a lubricating agent which is capable of polluting the compressed fluid.

Advantageously, the first housing can be provided in the fluid-supply channel.

According to one particularly preferred embodiment, said first housing can be provided in a first support element disposed centred relative to the axis of the shaft in the fluid-supply channel, and retained on the walls of said fluid-supply channel by means of branches between which the fluid can circulate.

Advantageously, the second housing can be provided in a second support element disposed in the frame centred relative to the axis of the shaft and opposite the first support element.

According to a preferred embodiment, the second support element can be mounted to slide in the frame and be connected to said frame by elastic means which are provided in order to absorb clearance variations between the rotor and the stator.

Advantageously, at least two aerodynamic bearings are provided, in addition, substantially on each side of the shaft of the rotor.

According to one embodiment, a first aerodynamic bearing can be provided upstream of the turbine, said first aerodynamic bearing being carried by a third support element disposed centred relative to the axis of the shaft in the fluid-supply channel, and retained on the walls of said fluid-supply channel by means of branches between which the fluid can circulate.

According to another embodiment, a first aerodynamic bearing can be provided downstream of the turbine.

Advantageously, a second aerodynamic bearing can be provided at the level of the end of the shaft of the rotor, on the opposite side to the fluid-supply channel.

According to a preferred embodiment, at least one of the first and second ends of the shaft of the rotor can comprise a third housing having the form of a cap disposed centred relative to the axis of the shaft and provided in order to receive said spherical element which is mounted freely in said third housing.

According to another embodiment, the spherical element can be integral with at least one of the first and second ends of the shaft of the rotor.

BRIEF DESCRIPTION OF THE DRAWINGS

The aims, advantages and features of the present invention will appear more clearly in the following detailed description of an embodiment of the invention, given solely by way of example, non-limiting and illustrated by the annexed drawings in which.

DETAILED DESCRIPTION OF THE INVENTION

Figure 1:
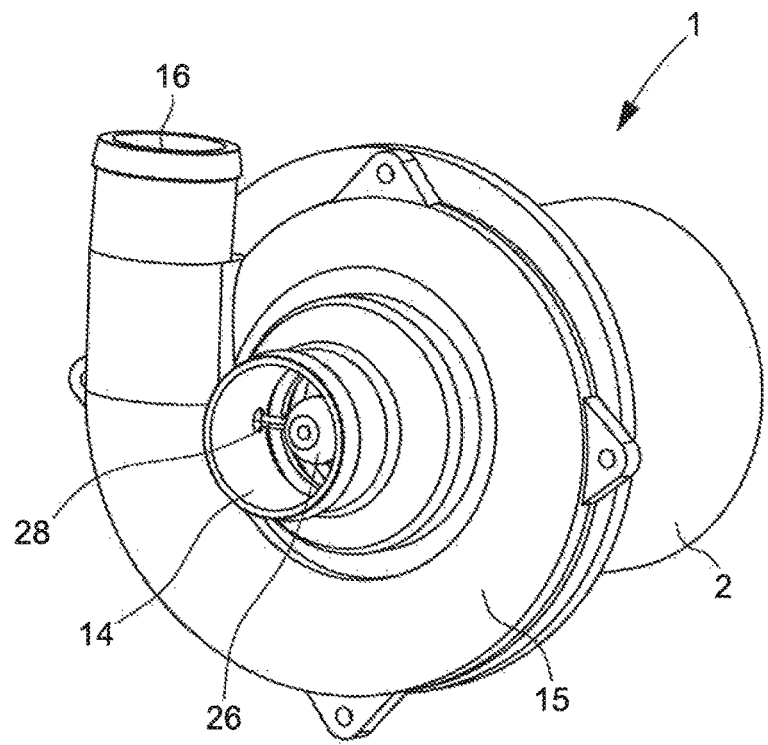
FIG. 1 represents a perspective view of a high-speed air compressor or water pump according to the invention.
Figure 2:
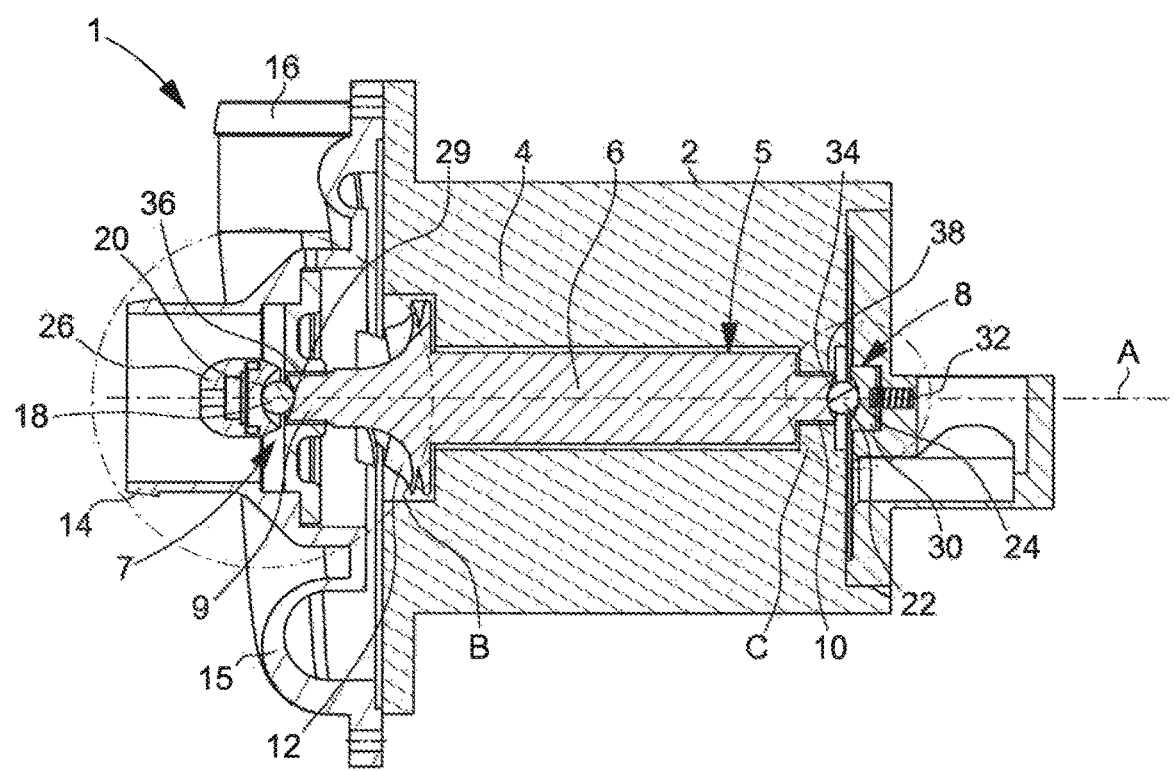
FIG. 2 represents a sectional view of the compressor of FIG. 1, FIGS. 3 and 4 are enlarged views of zones B and C respectively of FIG. 2.

With reference to FIGS. 1 and 2, there is represented a high-speed air compressor or water pump 1, of the turbo-compressor or centrifugal compressor type, the air compressor being used in order to increase the pressure of the air and the water pump being used in order to increase the pressure of the water. In the following description, the term "fluid" can be air when it is associated with a compressor or water when it is associated with a pump.

In a manner known per se, the air compressor or water pump 1 comprises a frame 2 in which there are mounted a stator and a rotor, represented schematically with, the references 4 and 5, respectively. The stator 4 and the rotor 5 interact in order to form a permanent-magnet synchronous electric motor (brushless motor).

The rotor 5 comprises a shaft 6 mounted rotatably on the frame 2 about an axis A by means of a first bearing 7 and a second bearing 8, the first bearing 7 being provided in order to support the first axial end 9 of the shaft 6 and the second bearing 8 being provided in order to support the second axial end 10 of the shaft 6. The first and second bearings 7 and 8 will be described in detail hereafter.

The shaft 6 carries a turbine 12 disposed on the side of the first axial end 9. It is of course possible to provide several turbines.

The air compressor or water pump 1 likewise comprises a channel 14 for fluid supply in the direction of the turbine 12, a body 15, and also an outlet channel 16 for compressed fluid, these elements being integral with the frame 2.

These various elements of the air compressor or water pump are known to the person skilled in the art and do not require detailed description here.

According to the invention, the first bearing 7 comprises a first spherical element 18 disposed on the first end 9 of the shaft 6, centred relative to the axis A of the shaft 6 and a first housing 20 provided on the frame 2 having the form of a cap disposed centred relative to the axis A of the shaft 6 and provided in order to support said first spherical element 18.

Similarly, the second bearing 8 comprises a second spherical element 22 disposed on the second end 10 of the shaft 6 centred relative to the axis A of the shaft 6 and a second housing 24 provided on the frame 2 having the form of a cap disposed centred relative to the axis A of the shaft 6 and provided in order to support said second spherical element 22.

Figure 3:
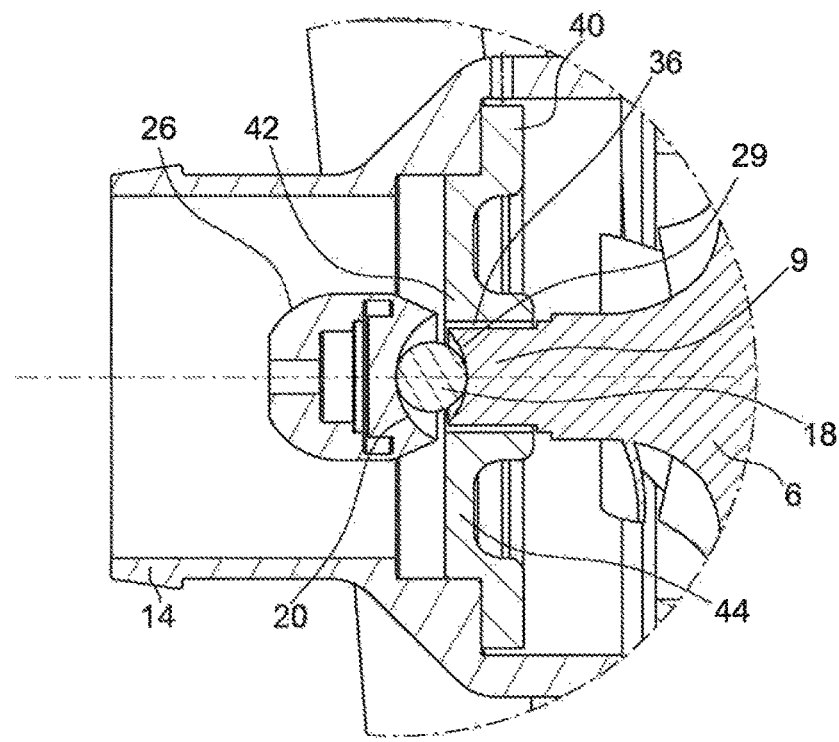

As FIG. 3 shows more precisely, the first housing 20 supporting the first spherical element 18 is provided in the fluid-supply channel 14. To this end, a first support element 26 having a truncated ovoidal form is disposed centred relative to the axis A of the shaft 6 in the fluid-supply channel 14. The first housing 20 has the form of a cap, with a full surface, produced at the end of the first support element 26 which is directed towards the interior. The radius of the cap forming the first housing 20 is greater than the radius of the first spherical element 18. The dimensions of the first housing 20 and of the first spherical element 18 are such that said first spherical element 18 is in contact with the inwardly curved base of the first housing 20. Preferably, the cap forming the first housing 20 and the first spherical element 18 are perfectly spherical in order to have a tangential contact between said first housing 20 and said first spherical element 18. The first support element 26 is retained on the interior walls of said fluid-supply channel 14 by means of three branches 28 (cf. FIG. 1). These branches 28 are at a spacing one from the other in order to allow fluid to enter into the air compressor or water pump 1.

According to the represented embodiment, the first axial end 9 of the shaft 6 comprises a third housing 29 having the form of a cap, with a full surface, disposed centred relative to the axis A of the shaft 6 and provided in order to receive the first spherical element 18<which is mounted freely in said third housing 29. The radius of the cap forming the third housing 29 is greater than the radius of the first spherical element 18. The dimensions of the third housing 29 and of the first spherical element 18 are such that said first spherical element 18 is in contact with the inwardly curved base of the third housing 29. Thus, the first spherical element 18 has the form of a ball mounted freely between the two caps forming the first and third housings 20, 29 between which the first spherical element 18 is retained. Preferably, the cap forming the third housing 29 and the first spherical element 18 are perfectly spherical in order to have a tangential contact between said third housing 29 and said first spherical element 18. The radius of the cap forming the third housing 29 can be equal to or different from the radius of the cap forming the first housing 20.

Figure 4:
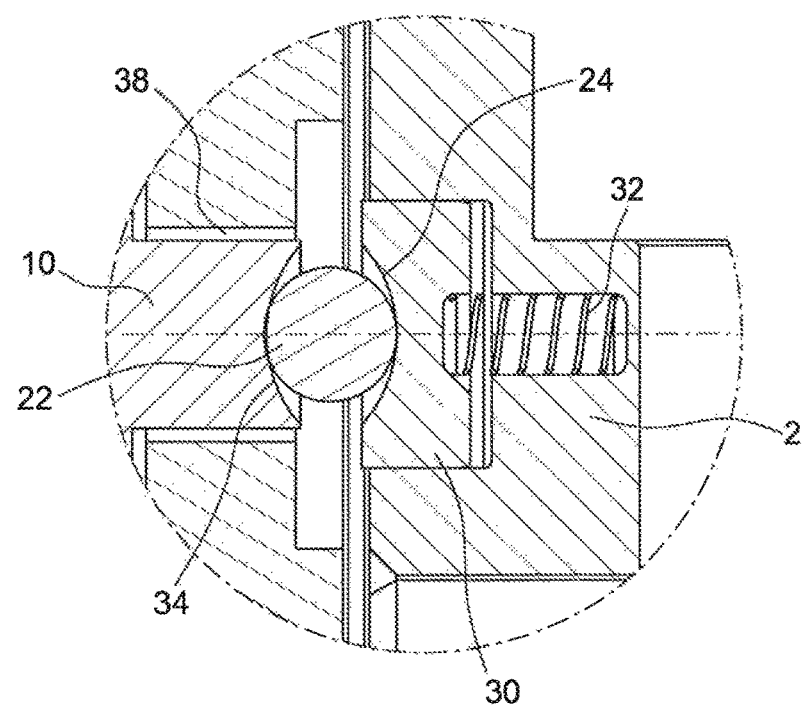

As FIG. 4 shows more precisely, the second housing 24 supporting the second spherical element 22 is provided in a second support element 30 disposed in the frame 2, centred relative to the axis A of the shaft 6, and opposite the first support element 26. The second housing 24 is formed in the second support element 30 in the form of a cap, with a full surface, disposed opposite the shaft 6. The radius of the cap forming the second housing 24 is greater than the radius of the second spherical element 22. The dimensions of the second housing 24 and of the second spherical element 22 are such that said second spherical element 22 is in contact with the inwardly curved base of the second housing 24. Preferably, the cap forming the second housing 24 and the second spherical element 22 are perfectly spherical in order to have a tangential contact between said second housing 24 and said second spherical element 22. The second support element 30 is mounted to slide in the frame 2 to which it is connected by elastic means 32, such as a spring, making it possible to absorb clearance variations between the rotor 5 and the stator 4.

According to the represented embodiment, the second axial end 10 of the shaft 6 comprises a fourth housing 34 having the form of a cap, with a full surface, disposed centred relative to the axis A of the shaft 6 and provided in order to receive the second spherical element 22 which is mounted freely in said fourth housing 34. The radius of the cap forming the fourth housing 34 is greater than the radius of the second spherical element 22. The dimensions of the fourth housing 34 and of the second spherical element 22 are such that said second spherical element 22 is in contact with the inwardly curved base of the fourth housing 34. Thus, the second spherical element 22 has the shape of a ball which is mounted freely between the two caps forming the second and fourth housings 24, 34 between which the second spherical element 22 is retained. Preferably, the cap forming the fourth housing 34 and the second spherical element 22 are perfectly spherical in order to have a tangential contact between said fourth housing 34 and said second spherical element 22. The radius of the cap forming the fourth housing 34 can be equal to or different from the radius of the cap forming the second housing 24.

According to another embodiment variant, not represented, the first spherical element 18 is integral with the first axial end 9 of the shaft 6. Similarly, the second spherical element 22 can be integral with the second axial end 10 of the shaft 6. To this end, the spherical element 18, 22 can be glued, driven-in on the end of the shaft 6 or formed in a single piece with said shaft 6.

The spherical element is produced preferably in ceramic material, or in any other suitable material, said material being able to have a surface treatment with a sliding effect (for example a coating made of polytetrafluorethylene, such as Teflon®, or any other suitable coating known to the person skilled in the art in order to have an extremely low coefficient of friction).

Advantageously, the air compressor or water pump 1 comprises, in addition, a first and a second aerodynamic bearing, provided substantially on each side of the shaft 6 of the rotor, towards the first, and second axial ends 9 and 10, and represented schematically with the references 36 and 38.

According to the embodiment represented in FIG. 3, the first aerodynamic bearing 36 is provided upstream of the turbine 12. To this end, a third support element 40 is provided, having a central body 42 disposed centred relative to the axis A of the shaft 6 in the fluid-supply channel 14, downstream of the first support element 26. The first aerodynamic bearing 36 is housed in the central body 42. The third support element 40 is retained on the interior walls of said fluid-supply channel 14 by means of three branches 44. These branches 44 are at a spacing one from the other in order to allow fluid to enter into the air compressor or water pump 1. These branches 44 comprise channels which make it possible to supply air to the first aerodynamic bearing 36.

In another variant, not represented, the first aerodynamic bearing can be provided downstream of the turbine 12. The channels which make it possible to supply air to the first aerodynamic bearing 36 can therefore be provided in the frame 2, which makes it possible to simplify the construction of the assembly.

The second aerodynamic bearing 38 is provided near the second axial end 10, and can be disposed in order to ensure axial and radial retention. According to a non-represented variant, it is possible to connect the second support element 30 to an electromagnet system which makes it possible, at low speed or in the case of a change in speed, to position said second support element 30 in order to support the second spherical element 22 so as to ensure central positioning of the shaft 6 in order to guarantee the functional axial and radial clearance at the level of the second aerodynamic bearing 38. In the other cases, the electromagnet system is provided in order to distance the second support element 30 from the second spherical element 22, and to free said second spherical element 22, the aerodynamic bearing 38 being therefore sufficient to guarantee the functional axial and radial clearance.

The aerodynamic bearings used are known to the person skilled in the art and do not require detailed description here. It is very evident that the use of aerodynamic bearings is optional, only the first and second bearings 7 and 8 being able to be used.

Figure 5:
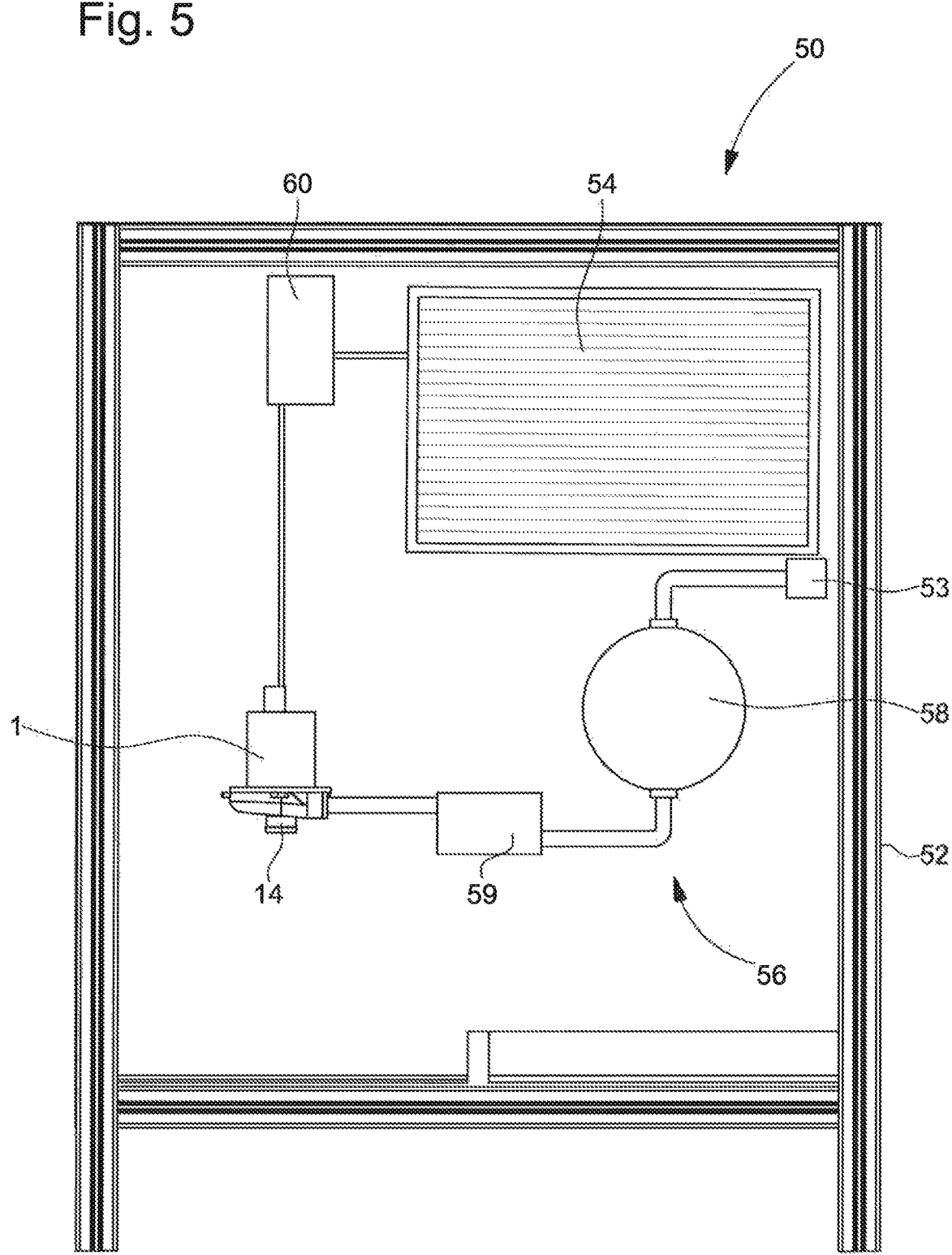
FIG. 5 illustrates schematically a machine equipped with a compressor according to the invention.

With reference to FIG. 5, there is represented a machine 50 comprising a main frame 52 including at least one functional element 53 which makes it possible to achieve the function of the machine, and a control unit 54. The machine comprises an air compressor or water pump 1, as described above, said air compressor or water pump 1 being integrated in the machine, inside the main frame 52. To this end, the main frame 52 comprises a fluid inlet provided in order to supply the air compressor or water pump 1 and to supply the fluid at the level of the fluid-supply channel 14. The main frame 52 likewise encloses a supply circuit 56 provided in order to supply the compressed fluid leaving the air compressor or water pump 1 to the functional element 53.

The main frame 52 likewise includes a compressed fluid reservoir 58 and also a pressure multiplier 59 provided between the air compressor or water pump 1 and the compressed fluid reservoir 58.

In addition, the main frame 52 includes a control unit 60 of the air compressor or water pump 1 provided in order to actuate the air compressor or water pump 1. The control unit 54 is provided in order to communicate with the control unit 60 in order to actuate the air compressor or water pump 1 only when needed by the functional element 53.

Preferably, the air compressor or water pump 1 is disposed in the machine 50 by positioning the axis A of the shaft 6 of the rotor 5 vertically. This vertical position and also the bearings of the invention comprising a single centred spherical element make it possible to retain, in the centre, the weight of the rotor 5 and to reduce, to a maximum, the risks of displacement of the shaft 6. There is therefore autocentring of the shaft 6, the bearings according to the invention allowing axial and radial retention. Furthermore, the use of aerodynamic bearings in combination with the bearings of the invention makes it possible to retain functional radial and axial clearance during start-up or a change in speed of the rotor 5.

The air compressor or water pump according to the invention makes it possible to achieve very high speeds of rotation, between 100,000 rpm and 1,000,000 rpm. These very high speeds make it, possible to provide an air compressor or water pump of smaller dimensions for the same power, allowing integration thereof in the main frame of a machine. Any connection of the machine to a compressor belonging to a central network is dispensed with. Thus, the compressed fluid-supply circuit to the functional element is very short. This reduces, on the one hand, the risks of leakage and, on the other hand, avoids pollution which is able to occur during transport of the compressed fluid through a central network. This likewise allows a very rapid reaction time of the air compressor or water pump, such that the latter can function solely upon demand of the functional element. When no compressed fluid is demanded by the functional element 53, the air compressor or water pump 1 is stopped such that there is no consumption of energy during this down time, the result of which is a reduction in the global energy consumption of the machine. Furthermore, the air compressor or water pump according to the invention functions without a lubrication agent such that no lubricant is at risk of polluting the compressed fluid.

The air compressor or water pump according to the invention can be used in numerous applications, such as industrial, medical, pharmaceutical, foodstuff, automobile applications, in particular for supplying compressed air, or in refrigeration, heating or air-conditioning applications, for supplying compressed fluid.

The invention claimed is:

1. An air compressor or water pump comprising:
    a frame in which there are mounted a stator, a rotor interacting with the stator to form a synchronous motor, the frame comprising:
    a shaft,
    at least one turbine carried by the shaft,
    a fluid-supply channel to the turbine, and
    an outlet channel for compressed fluid, the shaft of the rotor being mounted rotatably on the frame about an axis by a first bearing and a second bearing,
    wherein the first and second bearings comprise first and second spherical elements, respectively, provided on first and second ends, respectively, of the shaft and disposed centered relative to the axis of the shaft, and first and second housings, respectively, provided in the frame and having a form of a cap with an inwardly curved base, the cap disposed relative to the axis of the shaft and provided to support the first and second spherical elements, respectively,
    wherein a radius of the inwardly curved base of the cap forming the first housing is greater than a radius of the first spherical element, said first spherical element having a tangential contact with the inwardly curved base of the first housing, and
    wherein a radius of the inwardly curved base of the cap forming the second housing is greater than a radius of the second spherical element, said second spherical element having a tangential contact with the inwardly curved base of the second housing.

2. The air compressor or water pump according to claim 1, wherein the first housing is provided in the fluid-supply channel.

3. The air compressor or water pump according to claim 2, wherein the first housing is provided in a first support element disposed centered relative to the axis of the shaft in the fluid-supply channel, and retained on walls of the fluid-supply channel by branches between which the fluid can circulate.

4. The air compressor or water pump according to claim 1, wherein the second housing is provided in a second support element disposed in the frame centered relative to the axis of the shaft and opposite the first support element.

5. The air compressor or water pump according to claim 4, wherein the second support element is mounted to slide in the frame and is connected to the frame by elastic means to absorb clearance variations between the rotor and the stator.

6. The air compressor or water pump according to claim 1, wherein at least two aerodynamic bearings are provided substantially on each side of the shaft of the rotor.

7. The air compressor or water pump according to claim 6, wherein a first aerodynamic bearing is provided upstream of the turbine, the first aerodynamic bearing being carried by a third support element disposed centered relative to the axis of the shaft in the fluid-supply channel, and retained on walls of the fluid-supply channel by branches between which the fluid can circulate.

8. The air compressor or water pump according to claim 6, wherein a first aerodynamic bearing is provided downstream of the turbine.

9. The air compressor or water pump according to claim 6, wherein a second aerodynamic bearing is provided at a level of the end of the shaft of the rotor, on an opposite side to the fluid-supply channel.

10. The air compressor or water pump according to claim 1, wherein at least one of the first and second ends of the shaft of the rotor comprises a third housing having a form of a cap disposed centered relative to the axis of the shaft and provided to receive the first spherical element which is mounted freely in the third housing.

11. The air compressor or water pump according to claim 1, wherein at least one of the first spherical element and the second spherical element is integral with a corresponding one of the first and second ends of the shaft of the rotor.

12. An air compressor or water pump comprising:
    a frame in which there are mounted a stator, a rotor interacting with the stator to form a synchronous motor, the frame comprising:
    a shaft,
    at least one turbine carried by the shaft,
    a fluid-supply channel to the turbine, and
    an outlet channel for compressed fluid, the shaft of the rotor being mounted rotatably on the frame about an axis by a first bearing and a second bearing,
    wherein the first and second bearings comprise first and second spherical elements, respectively, provided on first and second ends, respectively, of the shaft and disposed centered relative to the axis of the shaft, and first and second housings, respectively, provided in the frame and having a form of a cap disposed relative to the axis of the shaft and provided to support the first and second spherical elements, respectively,
    wherein at least one of the first and second ends of the shaft of the rotor comprises a third housing having a form of a cap disposed centered relative to the axis of the shaft, the third housing provided to support one of the first spherical element and the second spherical element oppositely of the first housing or the second housing, and
    wherein a radius of an inwardly curved base of the cap forming the third housing is greater than a radius of the first spherical element, said first spherical element having a tangential contact with the inwardly curved base of the third housing.

* * * * *